E. W. DEMING.
BAG FILTER.
APPLICATION FILED NOV. 2, 1916.

1,334,692.

Patented Mar. 23, 1920.
3 SHEETS—SHEET 1.

Inventor:
Eugene W. Deming,
By Byrnes Townsend & Brickenstein,
Attorneys.

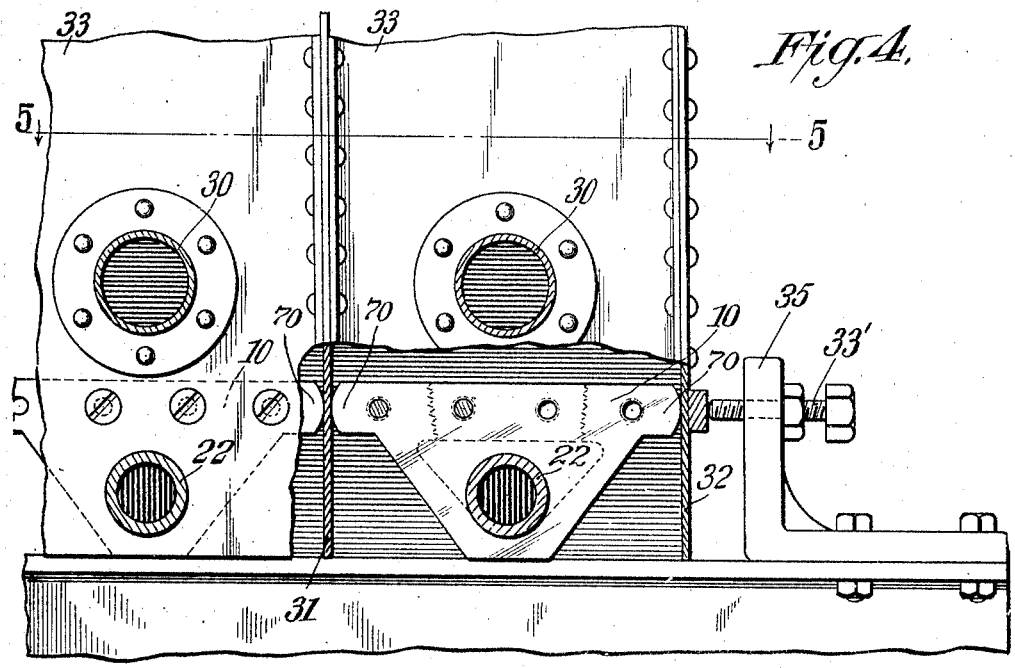
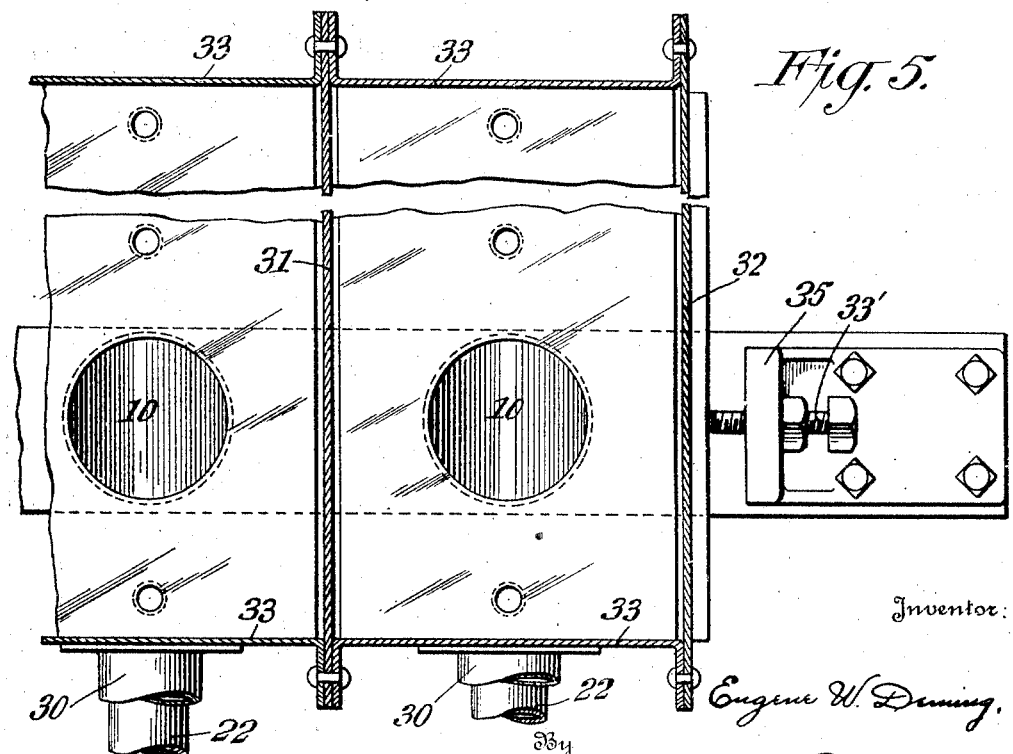

UNITED STATES PATENT OFFICE.

EUGENE W. DEMING, OF NEW YORK, N. Y.

BAG-FILTER.

1,334,692.   Specification of Letters Patent.   Patented Mar. 23, 1920.

Application filed November 2, 1916. Serial No. 129,107.

*To all whom it may concern:*

Be it known that I, EUGENE W. DEMING, a citizen of the United States, residing at New York, in the county of New York and State of New York, have invented certain new and useful Improvements in Bag-Filters, of which the following is a specification.

My invention relates to a pressure filter for the separation of solids and the like from liquids in which they are carried in suspension. This new form of filter press has been found to be particularly useful in the filtration of sugar solutions, though capable of use in many other relations.

In the manufacture of sugar, three types of filters are commonly used, viz: (1) the Taylor bag filter, which consists of a perforated supporting plate, having a closed bottom bag under each opening, the liquid to be filtered flowing into the bags from the top; (2) filter presses, consisting of a series of distance frames and cloth covered plates, the plates and frames being held together by means of a screw or hydraulic pressure, the liquid to be filtered being introduced under pressure between adjacent filter plates on which the solids accumulate to form a cake; and (3) mechanical filters in which a series of frames are covered with filtering cloth and immersed in a closed vessel, the liquid under head or pressure passing from the outside to the inside of the frames and the solids being deposited on the outside of the frames. In each of these types of filter, much time is wasted in removing and cleaning the bags, in opening the presses and removing the cakes, or in removing and changing the filter cloths.

My invention relates to a filter of the bag type, in which the bags are arranged in such manner that they need not be removed until worn out, the several operations of filtering, washing the deposited mud, removing the mud and cleaning and sterilizing the bags, all being performed *in situ.*

My invention further relates to a method and apparatus for supplying the liquid to be filtered, and other fluids under pressure, so that filtration is rapidly effected.

It further relates to a system in which a series of bag-filters are operated as a unit, as many units as desired being combined into one system, each unit being separately operated.

My invention further relates to the particular construction and arrangement of the individual filters which, while they have been above referred to as "bags," comprise open ended tubes of suitable material such as seamless woven fabric, the open ends of the bags being connected at each end to suitable conduits for the purpose of introducing liquids thereinto from either end, the filter tubes being surrounded by supporting reticulated metal tubes. The filter unit consists of a series of such filter tubes connected at top and bottom to manifold tubes, the liquor to be filtered, the drying gas and the washing liquid being introduced into the inside of these tubes, while the filtered liquor passes through the walls of the filter tubes and flows down to a suitable collecting agency.

A distinguishing feature of my invention is that the filtering and drying of the deposited cake and washing therefrom of desirable material, subsequent removal of the cake and cleaning of the bags or tubes are all effected *in situ*, the bags remaining in place until worn out. This arrangement and the provision of a suitable piping system for introducing the various fluids effects a great saving in time and labor and enables large quantities of liquor to be readily and ecomically filtered.

My invention further relates to other features of construction and arrangement, which are hereinafter pointed out in the specification and claims.

The construction and operation of my improvement will be understood from the accompanying specification and drawings, in which Figure 1 is a side elevation of the system, four units being shown;

Fig. 4 is a detail, partly in section, showing the manner in which several units are connected;

Fig. 5 is a sectional plan view on plane 5—5 of Fig. 4; and

Figure 3:
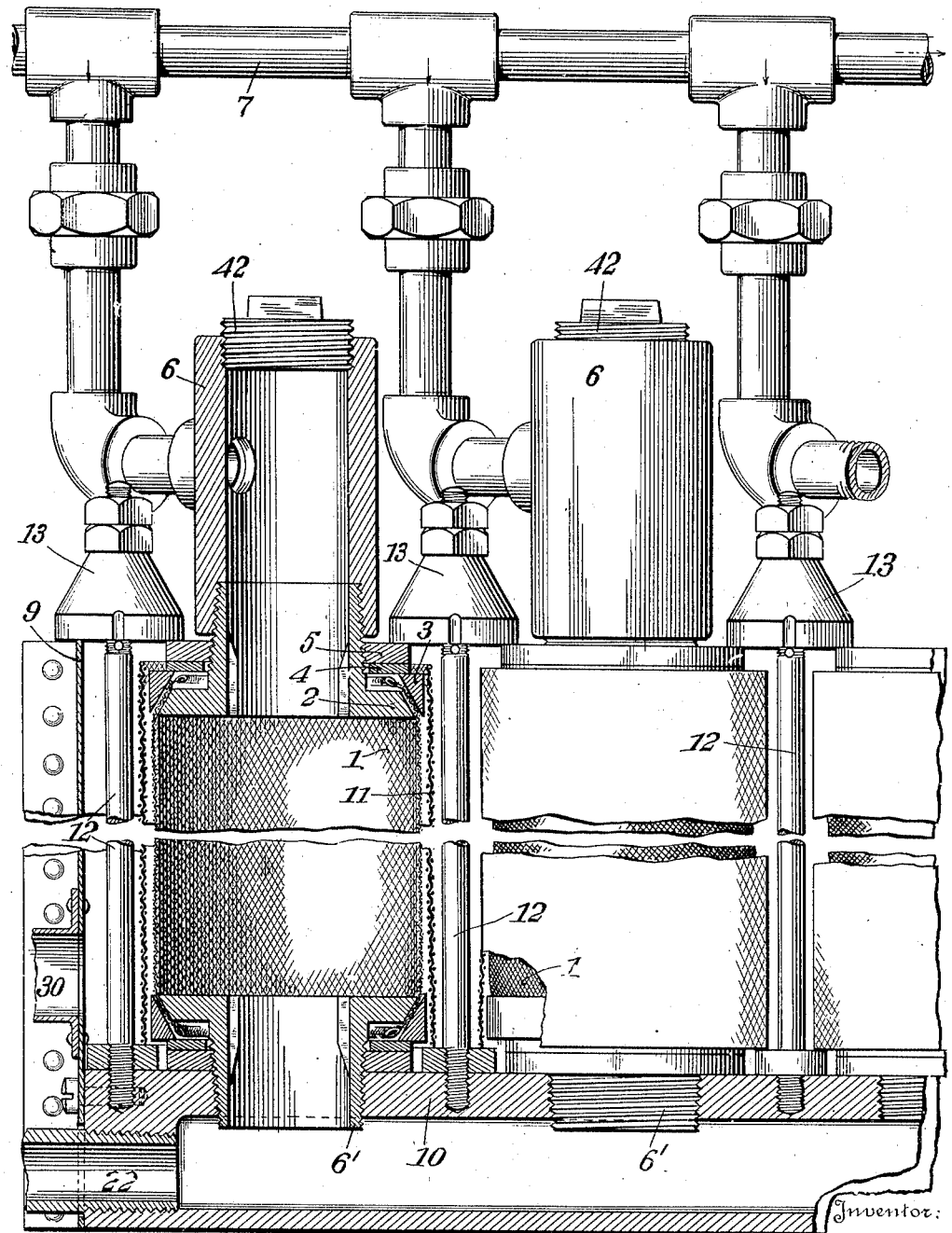
Fig. 3 is a part sectional elevation showing the top and bottom connections of the bags.

Referring to Fig. 3, the filter bags 1, are tubes of any suitable filtering material, preferably of seamless woven material, and are supported at the top by a tubular fitting 2, to which the upper edge of the bag is secured by a wedge ring 3, washer 4, and nut 5. The fitting 2 screws into a T, 6, which is in turn carried by a manifold 7, supported in any suitable manner, as by brackets 8, riveted to the casing 9. At its lower end, each bag is similarly secured to a tubular fitting 6′, screwed into a manifold 10, connecting with all the bags of each unit.

Surrounding each bag is a tube of woven wire netting 11, within which the bags fit loosely, but without folds, this woven wire tube acting as a support for the bag when the liquid under pressure is admitted to the interior of the bag. 12, 12, are holding down rods screwed at their lower ends into the manifold casting and provided at their upper ends with caps 13, whose edges rest upon the nuts 5, 5 of adjoining bag fittings. These rods serve as abutments to take up the pressure strain against the upper bag-fitting.

Each filter thus consists of a bag, open at top and bottom, surrounded by a reticulated filter support and connected to a manifold at top and bottom.

These manifolds are connected by a pipe 14, provided with valves 15, 16, and having above the valve 15, a valved exhaust connection 16′.

Figure 1:
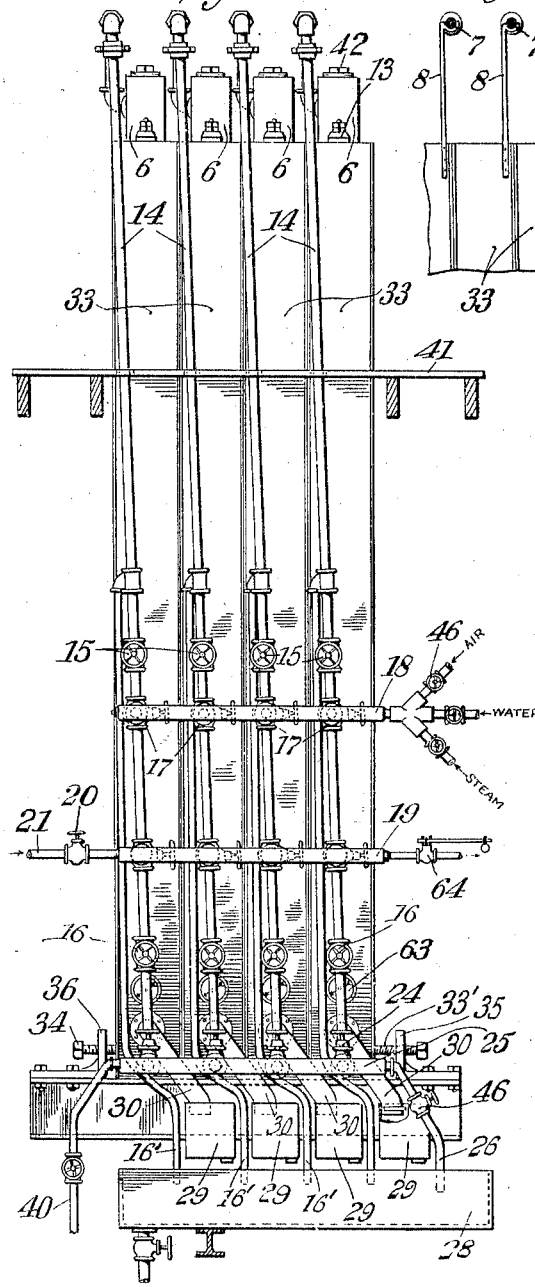
Figure 6:
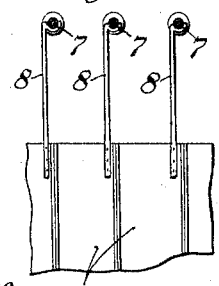
Fig. 6 is a detail.
Figure 2:
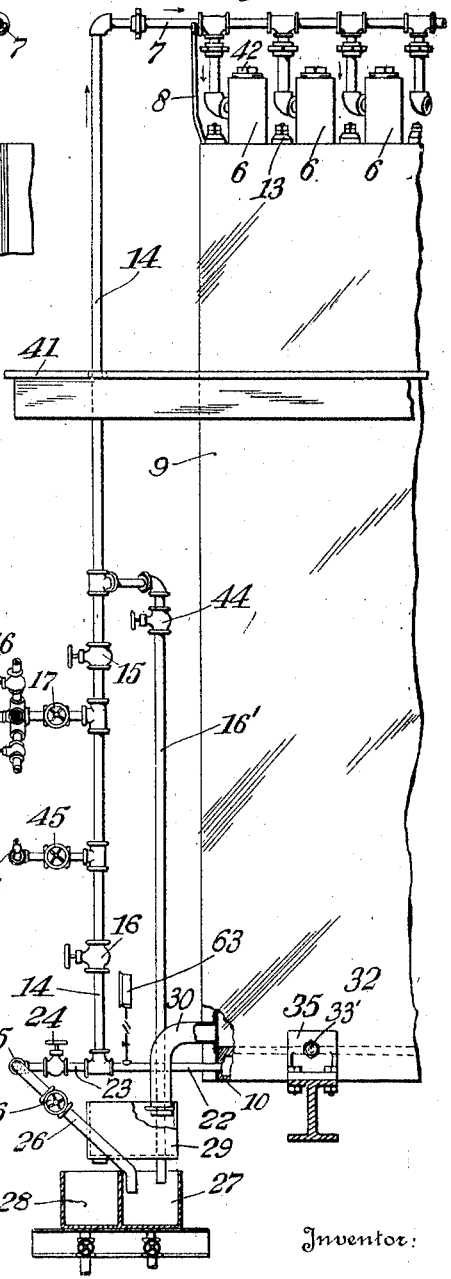
Fig. 2 is a front elevation of Fig. 1.

Each pipe 14 is connected through valve 17 to a manifold 18 extending across the end of the series of filter units, this manifold having valved connections for air, water, and steam as shown in Fig. 1. The pipes 14 are similarly connected to a second manifold 19, having a valve 20, and inlet pipe 21, through which the liquid to be filtered is introduced, this manifold being provided with a safety valve 64.

Each pipe 14 is also, at its lower end, connected to manifold 10 by a pipe 22 (to which is connected a pressure gage 63), and by pipe 23, provided with valve 24 to manifold 25, from which lead valved pipes 26 to the return gutter. Adjacent this gutter 27, is a second gutter 28 for clear or filtered liquid. Mounted above these gutters are a series of swinging boxes 29 (one for each unit) arranged so that the liquid flowing thereinto from the discharge pipe 30 can be discharged into either one of the gutters. The manifold 25 has at one end a valved discharge pipe 40, through which the mud is delivered to any suitable receptacle. The manifold 10 is a casting of a general V-shape and extends under all the filters of a unit, and is provided with screw threaded openings to receive the bottom fittings 6′ of the bag-holders and with screw threaded holes to receive the screw threaded ends of the holding down rods 12. It is provided with side flanges 70, preferably rounded, so that a substantially liquid tight joint will be made with the partition plates 31, when the several units of the system are assembled.

The partition plates 31, and the plates 32, 33, of which the exterior surrounding case are made, are of light (in practice #24) galvanized iron plates, which are punched, cut and riveted together at the place of assemblage of the pressure filter.

The several units are pressed together by screws 33′, 34 carried by brackets 35, 36, mounted on the supporting beams. The interior casing and partition plates are not essential, but are preferred, as they serve to retain the heat.

The whole structure therefore consists of an open topped casing, the bottom of which is formed by the series of manifolds, the filter-bags being arranged in rows of any desired number, each row constituting an independent unit.

The pipe connections are such that liquor may be introduced either at the top or bottom of the filters, though it is usually introduced from below.

The filtered liquor after its passage through the filter-cloths runs down outside the woven wire casings onto the tops of the manifolds and discharges through pipes 30.

41 is a platform near the top of the casing, from which the operator can clean the bags, this operation being effected by removing the plugs 42 (Fig. 3) and inserting into the inside of the bag, a hose provided with a suitable nozzle for discharging water against the inner walls of the bags.

The operation of the device is as follows:

Each unit is operated separately and has its own system of piping. The valves 15, 17 and 24 are closed, and valves 20, 45 and 16 are opened, and the liquor to be filtered is delivered through pipe 23 into the interior of the manifold 10 and rises to the top of the bags. Liquor immediately begins to pass through the walls of the bags and casing, runs down to the bottom and is discharged through pipe 30 into box 29, which is turned at first to deliver into return gutter 27, as the first liquor escaping is not clear. As soon as clear liquor begins to escape, the box 29 is turned over the gutter 28 for clear liquor. The pressure on the liquor is gradually raised until the maximum desired pressure (e. g. 50 lbs. per square inch) is obtained, by which time there will probably be deposited on the inner wall of the bag a layer about one inch thick. The supply of liquor to be filtered is then cut off by closing valves 45 and 16, the valves 15, 17 and 46 opened, and air under pressure is introduced into the top of the bags, thus forcing the liquid contents of the bags out through the bottom manifold into the return liquor gutter, whence it is delivered to the supply tank. The core of unfiltered liquor inside of the bag would of course flow out by gravity and the use of air-pressure is not essential, but it is preferred to use the air-pressure to maintain this wall of cake against the sides of the bag so that the bag can not wrinkle or pull away from the wire netting. For this purpose an air-pressure of 15 lbs. per square inch has been found to be sufficient to prevent shrinking and breaking of the wall of mud, which if permitted would allow portions of the mud to fall into the discharging liquor and thus return to the supply tank.

It is desirable to further increase the air-pressure up to 20 lbs. per square inch or more, to force the moisture ("sweet") out of the cake, and thus reduce its moisture content to a low percentage, as there thus results less possibility of the "sweet" in the cake backing out into the wash water and being lost therewith because there is less "sweet" left in the cake. The air-pressure is maintained for ten or fifteen minutes with the result that the moisture is forced out of the cake until it is nearly dry. By proper manipulation of the valves water under somewhat greater pressure than the air, is then introduced into the manifold 10 and rising inside the bags, displaces the air, (valve 44 having been opened). As soon as the air has been displaced, the air escape is closed, and the water pressure is run up to, if it has not already reached, the maximum working pressure (say 50 lbs.), the water in passing through the cake exhausting the cake of all soluble material (the "sweet" in case sugar juices are being filtered). The water supply valves are then closed, the plugs 42 removed and by means of a hose provided with a suitable nozzle, water under pressure is used to clean off the bags, the water and removed mud, now practically free from all "sweet" or other material to be recovered, being discharged from manifold 10 through pipe 23 into manifold 25 (valve 46 being closed) and discharged to waste through pipe 40. The cleaning of the bags can be readily effected, in practice at the rate of one a minute, and this operation finished, the unit is restored to service. This cleaning has been found in practice to be thorough, and the bags need not be removed until worn out.

Any bag when broken may be removed without disturbing any other bag of the unit; and additional units may be added without change or putting out of commission the existing units.

In case it is desired at any time to sterilize the bags, steam can be introduced in the same manner as the air, by making the proper connections, or steam under pressure may be introduced into the hose used for washing.

The bags may be from 2 to 20 feet long, and from 2 to 20 bags may be used in one unit. In practice, units of 13 bags, each eight feet long, and eight units in each filter, form a satisfactory system for the treatment of sugar solutions.

Such a filter corresponds in filter surfaces to four 500 sq. ft. filter presses and will readily handle the "cachaza" from 500 to 600 tons of cane.

While the system described is designed mainly for use as a pressure filter, it will be obvious that it may be operated as a gravity filter, and that many of the new features are available for such use.

The use of air pressure followed by washing water under pressure effects the removal from the cake of all desirable material with a minimum dilution of the solution.

I claim:—

1. A filter comprising an open ended tubular filtering medium and fluid supplying means connected to each end thereof, said means comprising means for introducing liquor to be filtered, a washing liquid and a gas.

2. A filter comprising an open ended tubular filtering medium and fluid supplying means connected to each end thereof, said means comprising means for introducing under pressure liquor to be filtered, a washing liquid and a gas.

3. A filter comprising a tubular open ended filtering medium, a fitting at each end thereof having a fluid passage and adapted to support said medium about its periphery, a chamber in connection with one of said fittings, an opening in said chamber having a removable closure, and means for facilitating the ready removal of said medium from said fittings.

4. A filter comprising a tubular open ended filtering medium, a fitting at each end thereof having a fluid passage and a peripheral annulus about which the filtering medium is supported, a support at one end of the filter with which the adjacent fitting is coupled, an annular ring about each annulus for maintaining the respective end of said medium against the annulus, a nut for holding each of said rings in position, rods parallel with said tubular medium and secured at one end in said support, and means at the other ends of said rods for securing said nuts and relieving the parts of strains.

5. A filter system comprising a series of open ended tubular filters, upper and lower manifolds to which the ends of said filters are secured, and separately controlled fluid supplying means connected to each manifold.

6. A filter system comprising a series of open ended tubular filters, upper and lower manifolds to which the ends of said filters are secured, and fluid supplying means connected to each manifold, said means comprising means for separately introducing liquor to be filtered and a washing liquid.

7. A filter system comprising a series of open ended tubular filters, upper and lower manifolds to which the ends of said filters are secured, and fluid supplying means connected to each manifold, said means comprising means for introducing liquor to be filtered, a washing liquid and a gas.

8. A filter system comprising a series of open ended tubular filters, upper and lower manifolds to which the ends of said filters are secured, separately controlled fluid supplying means connected to each manifold, and a discharge pipe connected to the lower manifold.

9. A filter system consisting of a series of units each comprising a series of open ended tubular filters, upper and lower manifolds to which the ends of said filters are secured, separately controlled fluid supplying means connected to each manifold, and a discharge pipe connected to the lower manifold, partition plates between each unit and the next and a casing to which the partition plates are connected.

10. A filter system consisting of a series of units each comprising a series of open ended tubular filters, upper and lower manifolds to which the ends of said filters are secured, separately controlled fluid supplying means connected to each manifold, and a discharge pipe connected to the lower manifold, partition plates between each unit and extending between the lower manifolds and means for forcing the manifolds into contact with the partition plates and a casing to which the partition plates are connected.

11. A filter device comprising a series of lower manifolds, upper manifolds, upright tubular filters extending to said upper manifolds, partition plates between said lower manifolds and means for forcing the manifolds into contact with the partition plates, whereby the lower manifolds each form the bottom of a chamber.

12. A filter unit comprising a manifold, a series of open-bottom tubular filters secured to and opening into said manifold, said manifold having means for discharging material therefrom, a conduit for introducing material into said manifold, said conduit having a plurality of valved connections for introducing material thereinto, and means for collecting the filtered liquid.

In testimony whereof I affix my signature in presence of two witnesses.

EUGENE W. DEMING.

Witnesses:
   EDW. C. SCHIFFMACHER,
   F. M. NESTLER.